W. F. SEHRT.
STUD BOLT DRIVER.
APPLICATION FILED MAY 22, 1919.
1,438,269.
Patented Dec. 12, 1922.
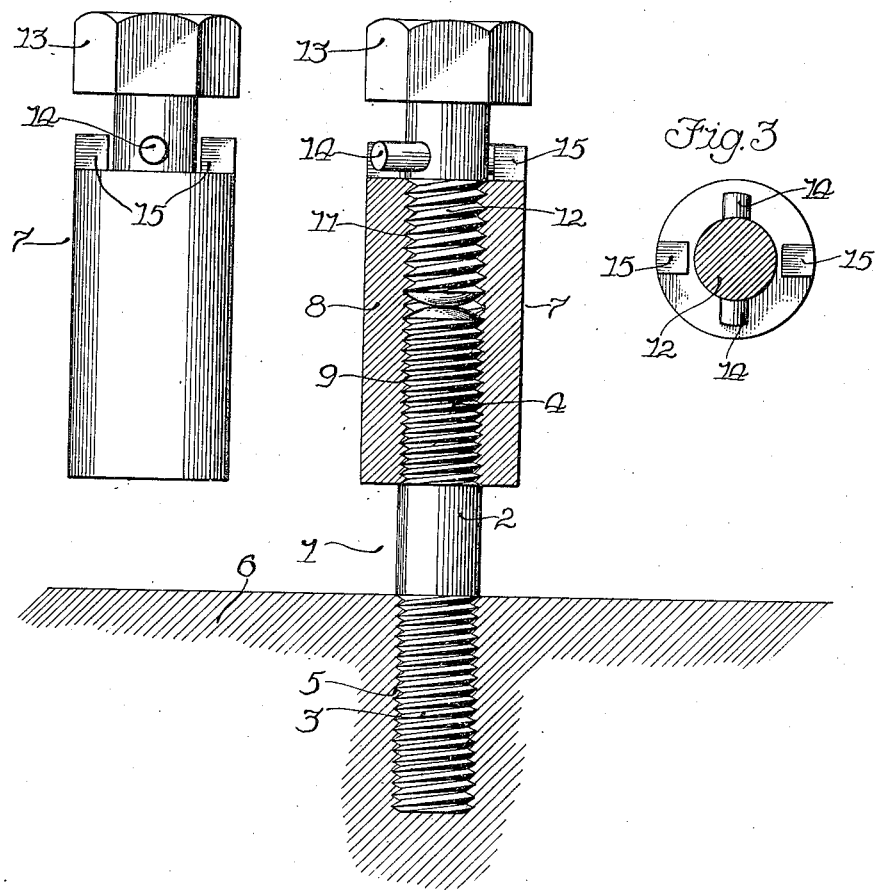
Inventor
William F. Sehrt,
By Brown, Boettcher & Diener
Attorneys Patented Dec. 12, 1922.

1,438,269

UNITED STATES PATENT OFFICE.

WILLIAM F. SEHRT, OF WAUKESHA, WISCONSIN.

STUD-BOLT DRIVER.

Application filed May 22, 1919. Serial No. 299,065.

*To all whom it may concern:*

Be it known that I, WILLIAM F. SEHRT, a citizen of the United States, residing at Waukesha, in the county of Waukesha and State of Wisconsin, have invented a certain new and useful Improvement in Stud-Bolt Drivers, of which the following is a full, clear, concise, and exact description, reference being had to the accompanying drawings, forming a part of this specification.

My invention relates to stud bolt drivers.

The primary object of my invention is to provide a tool for driving stud bolts which can be quickly and easily released from the stud bolt after the same has been driven into position.

A secondary object of my invention is to provide a tool of the above class which is of simple and inexpensive construction. These and other objects will be more apparent in the following description taken in connection with the accompanying drawing in which I have shown a preferred embodiment of my invention.

Figure 1 is an enlarged sectional view of the tool applied to a stud bolt;

Figure 2 is an elevational view of the tool itself; and

Figure 3 is a plan sectional view illustrating the lost motion connection between the cap screw and socket member.

The stud bolt, which is designated 1, is representative of any type of conventional stud bolt, consisting of the intermediate shank portion 2 and the threaded ends 3 and 4. In the standard type of stud bolt the threads 3 and 4 are of substantially the same pitch and depth. The uses of this type of bolt are manifold and are so well known as not to require description. In the particular situation shown, the bolt 1 has been driven into a tapped hole 5 in the top of a cylinder block 6 of an internal combustion engine for the purpose of receiving and bolting a removable cylinder head thereon.

The stud bolt driver is broadly designated 7 and comprises a sleeve-like socket member 8, the lower end of which is tapped with a standard thread 9 for receiving the end of the stud bolt 1. The thread 9 is designed to thread freely over the threaded end 4, so as to avoid any binding when removing the socket member 8. The upper end of the socket member 8 is tapped with a thread 11, of relatively sharper pitch, for receiving a screw member 12. The screw member 12 preferably consists of a cap screw or similar machine screw which is provided with a hexagonal head or the like 13 adapted to be grasped by a wrench or chuck for driving the stud bolt 1. Passing diametrically thru the shank of the cap screw 12 is a short pin 14 which co-operates with the two diametrically opposite lugs 15—15 on the end of the socket member 8 and thus affords a lost motion connection between the socket member 8 and the cap screw 12.

The use of the tool is as follows:

After the stud bolt 1 has been threaded into the tapped hole 5 as far as it will go freely, the stud bolt driver 7 is threaded over the end of the stud bolt 1 and a wrench is applied to the head of the cap screw 12, whereby the stud bolt is drawn up hard against the bottom of the hole 5. In the initial rotation of the cap screw 12 the projecting pin ends 14 come into engagement with the lugs 15 and thereafter the socket member and cap screw 12 rotate as a unit.

It will be apparent that when the stud bolt draws up tight in the hole 5, the upper end 4 thereof will also draw up tight in the socket member 8. Inasmuch as the threads 3 and 4 are of substantially the same pitch and are substantially the same length, the binding engagement will be substantially the same at both ends of the stud bolt and therefore any effort at unscrewing the sleeve member 8 directly will be as likely to release the stud bolt from the hole in the cylinder block. It will be apparent that the binding of the threaded end 4 in the sleeve member 8 results from the reaction of the stud bolt 1 abutting the lower end of the cap screw 12. The reaction of the stud bolt 1, abutting the lower end of the cap screw 12, has of course the effect of also binding the cap screw in the socket member 8, but in a lesser degree than either end of the stud bolt 1 by reason of the much higher pitch of the thread on the cap screw 12. Owing to the greater pitch angle of the thread on the cap screw 12 the frictional surfaces of the screw threads are more obtuse to the direction of rotation and therefore the threads do not bind nearly so hard as do the threads on the stud bolt 1.

Consequently, when it is desired to release the stud bolt driver after the stud bolt has been driven home, all that is required is a slight backward rotation of the cap screw 12. The binding tendency of the thread 11 being less than that of either of the threads 3 and 4, the cap screw 12 immediately yields without loosening the stud bolt 1 and backs away from the bolt end 4, whereupon the binding action between the stud bolt and driver is relieved and the stud bolt driver may be readily unscrewed from the stud bolt.

I do not intend to be limited to the particular details herein shown and described.

I claim:

1. In a device of the class described, a barrel member, said barrel member being bored out centrally from end to end, a standard thread of relatively small pitch angle formed directly in one end of said bore, a continuous standard thread of relatively large pitch angle formed directly in the other end of said bore, said threads substantially intersecting in the intermediate portion of said bore, the thread of relatively small pitch angle being adapted for engaging over the end of a stud bolt, and a cap screw threading down into said thread of relatively large pitch angle for releasably locking said stud bolt in said barrel member.

2. In a device of the class described, a socket member, said socket member being bored out centrally from end to end, one end of said bore having a thread of relatively small pitch angle formed directly therein for engaging over the end of a stud bolt, the other end of said bore having a continuous, standard internal thread of relatively large pitch angle formed wholly on the inner walls of said bore, and a cap screw threading into said latter thread and adapted to releasably lock said stud bolt in said socket member, the difference in pitch angles between said latter thread and the thread on said stud bolt, cooperating to release said cap screw upon reverse rotation thereof.

3. In a device of the class described, a threaded socket member for receiving the end of a stud bolt, means having screw threaded engagement in said socket member for releasably locking said stud bolt therein, and means independent of the screw threads on said first means for permitting a lost motion relation between said first means and said socket member.

4. In combination, a stud bolt driver, comprising a threaded socket member for receiving the end of a stud bolt, screw means in said socket member for releasably locking said stud bolt in said socket member, said screw means being rotatable relative to said socket member and means for limiting the rotation of said screw means relative to said socket member for preventing the removal of said screw means from said socket member.

5. A stud bolt driver comprising in combination a socket member having a threaded socket for receiving the end of the stud bolt, a screw member threading into said socket member for releasably holding said stud bolt in said socket member, said screw member having a thread of relatively large pitch angle, and means permitting partial rotation of said screw member in said socket member, but preventing entire removal of said screw member from said socket member.

6. A stud bolt driver comprising in combination, a socket member having a threaded socket for receiving the end of a stud bolt, a bolt threading into the other end of said socket member and adapted to engage the end of said stud bolt, said latter bolt having a thread of greater pitch than said stud bolt, and a lost motion connection between said latter bolt and said socket member.

7. A stud bolt driver comprising in combination, a sleeve member having a threaded socket in one end for receiving the end of the stud bolt, a screw threading into the other end of said sleeve member, said screw having a thread of sharper pitch than said stud bolt, and a projection on said screw co-operating with a projection on said sleeve member for affording a lost motion connection between said screw and said sleeve member.

8. A stud bolt driver comprising in combination, an annular socket member having a central bore tapped with threads of different pitch, the thread of one pitch forming a socket member for receiving the end of the stud bolt, a cap screw engaging in the thread of the other pitch, and a pin projection from the shank of said cap screw adapted to co-operate with a lug on the end of said socket member.

In witness whereof I hereunto subscribe my name this 12th day of May, 1919.

WILLIAM F. SEHRT.